US011898067B2

(12) United States Patent
Schümann et al.

(10) Patent No.: US 11,898,067 B2
(45) Date of Patent: Feb. 13, 2024

(54) REACTIVE 2-COMPONENT ADHESIVE SYSTEM IN FILM FORM HAVING IMPROVED HEAT-AND-HUMIDITY RESISTANCE

(71) Applicant: TESA SE, Norderstedt (DE)

(72) Inventors: Uwe Schümann, Pinneberg (DE); Clementine Pradier, Sainte Foy les Lyon (FR)

(73) Assignee: TESA SE, Norderstedt (DE)

( * ) Notice: Subject to any disclaimer, the term of this patent is extended or adjusted under 35 U.S.C. 154(b) by 779 days.

(21) Appl. No.: 16/466,148

(22) PCT Filed: Nov. 22, 2017

(86) PCT No.: PCT/EP2017/080026
§ 371 (c)(1),
(2) Date: Jun. 3, 2019

(87) PCT Pub. No.: WO2018/104053
PCT Pub. Date: Jun. 14, 2018

(65) Prior Publication Data
US 2020/0062998 A1  Feb. 27, 2020

(30) Foreign Application Priority Data
Dec. 5, 2016  (DE) .................. 10 2016 224 169.9

(51) Int. Cl.
| C09J 4/06 | (2006.01) |
| C09J 7/38 | (2018.01) |
| C08K 3/20 | (2006.01) |
| C08K 5/14 | (2006.01) |
| C08K 5/17 | (2006.01) |
| C08K 5/56 | (2006.01) |
| C08L 39/06 | (2006.01) |
| C08L 75/04 | (2006.01) |

(52) U.S. Cl.
CPC ................ *C09J 4/06* (2013.01); *C09J 7/385* (2018.01); *C08K 3/20* (2013.01); *C08K 5/14* (2013.01); *C08K 5/17* (2013.01); *C08K 5/56* (2013.01); *C08L 39/06* (2013.01); *C08L 75/04* (2013.01); *C09J 2203/00* (2013.01); *C09J 2301/408* (2020.08)

(58) Field of Classification Search
None
See application file for complete search history.

(56) References Cited

U.S. PATENT DOCUMENTS

| 3,591,438 A | 7/1971 | Toback et al. |
| 4,284,731 A | 8/1981 | Moser et al. |
| 4,364,972 A * | 12/1982 | Moon .................. C09J 7/385 |
| | | 427/516 |
| 4,726,982 A * | 2/1988 | Traynor .................. C09J 139/04 |
| | | 428/317.5 |
| 5,036,143 A | 7/1991 | Brauer et al. |
| 5,784,198 A | 7/1998 | Nagaoka |
| 6,893,583 B2 | 5/2005 | Sakurai et al. |
| 8,957,156 B2 * | 2/2015 | Kim ...................... C08G 18/718 |
| | | 522/90 |
| 9,562,172 B2 | 2/2017 | Koga et al. |
| 9,868,250 B2 | 1/2018 | Beuer et al. |
| 10,400,140 B2 | 9/2019 | Schümann et al. |
| 10,711,163 B2 | 7/2020 | Schümann et al. |
| 2004/0228998 A1 | 11/2004 | Haas |
| 2010/0058656 A1 | 3/2010 | Chevalier et al. |
| 2011/0086973 A1 | 4/2011 | Kobayashi et al. |
| 2011/0111221 A1 | 5/2011 | Schümann et al. |
| 2013/0233485 A1 * | 9/2013 | Herr .......................... C09J 7/28 |
| | | 428/355 AK |
| 2014/0377554 A1 | 12/2014 | Cho et al. |
| 2015/0024218 A1 | 1/2015 | Koga et al. |
| 2016/0108287 A1 | 4/2016 | Schümann et al. |
| 2019/0241767 A1 | 8/2019 | Schümann et al. |

FOREIGN PATENT DOCUMENTS

| CN | 103314068 A | 9/2013 |
| CN | 105324450 A | 2/2016 |
| DE | 696 14 869 T2 | 4/2002 |
| DE | 602 08 456 T2 | 7/2006 |
| DE | 10 2008 048 486 A1 | 4/2010 |
| DE | 10 2013 222 739 A1 | 12/2014 |
| EP | 0 300 847 A1 | 1/1989 |
| EP | 0 313 071 A2 | 4/1989 |
| EP | 2 325 220 A1 | 5/2011 |
| EP | 3 010 989 A1 | 4/2016 |

(Continued)

OTHER PUBLICATIONS

Oliver Brüggermann, "Vinylmonomere" Römpp-Onlie Stichwort, Nov. 2008.
English translation of International Search Report dated Feb. 27, 2018, in connection with PCT International Application No. PCT/EP2017/080026.
Search Report dated May 29, 2017, and issued in connection with German Patent Application No. 10 2016 224 169.9.
Office Action dated Nov. 19, 2020, in connection with Korean Patent Application No. 10-2019-7018909.
Translation of Office Action dated Oct. 4, 2018, in connection with Japanese Patent Application No. 2016-520366.
Office Action dated Jun. 15, 2018, in connection with Chinese Patent Application No. 201480034547.1.

(Continued)

*Primary Examiner* — Tae H Yoon
(74) *Attorney, Agent, or Firm* — Norris McLaughlin PA

(57) ABSTRACT

The present invention relates to a reactive adhesive film comprising (a) a polymeric film-forming matrix, (b) at least one reactive monomer or reactive resin, and (c) a reagent selected from an initiator, in particular a radical initiator, or an activator, featuring enhanced heat-and-humidity resistance, and to a reactive 2-component adhesive system in film form for bonding diverse materials, such as, for example, metal, wood, glass and/or plastic material.

20 Claims, No Drawings

(56) References Cited

FOREIGN PATENT DOCUMENTS

| | | | |
|---|---|---|---|
| EP | 3010989 A1 | | 4/2016 |
| GB | 1077083 | | 7/1967 |
| JP | 51-9131 | | 1/1976 |
| JP | S51-9131 A | | 1/1976 |
| JP | 1-98678 A | | 4/1989 |
| JP | H01-98678 A | | 4/1989 |
| JP | 8-314398 A | | 11/1996 |
| JP | 2004308015 A | * | 11/2004 |
| JP | 2009-001765 A | | 1/2009 |
| JP | 2009-1765 A | | 1/2009 |
| KR | 10-2014-0126740 A | | 10/2014 |
| KR | 10-2016-0021828 A | | 2/2016 |
| WO | WO 00/36042 | * | 6/2000 |
| WO | 2012/128294 A1 | | 9/2012 |
| WO | 2013/083406 A1 | | 6/2013 |
| WO | 2013/137621 A1 | | 9/2013 |
| WO | 2013137621 A1 | | 9/2013 |
| WO | 2014/202402 A1 | | 12/2014 |
| WO | 2004202402 A | | 12/2014 |

OTHER PUBLICATIONS

Translation of Office Action dated May 15, 2019, in connection with Japanese Patent Application No. 2016-520366.
German Search Report dated Mar. 13, 2014, and issued in connection with German Patent Application No. 10 2013 222 739.6.
International Search Report dated Aug. 12, 2014, and dated Aug. 25, 2014, in connection with PCT International Application No. PCT/EP2014/061748.
Translation of International Search Report dated Aug. 12, 2014, and dated Aug. 25, 2014, in connection with PCT International Application No. PCT/EP2014/061748.
Machine translation of EP0300847 (Jul. 7, 2017).
Translation of Office Action dated Mar. 23, 2018, in connection with Japanese Patent Application No. 2016-520366.
Office Action dated Apr. 23, 2018, and issued in connection with Canadian Patent Application No. 2,913,389.
Office Action dated Jan. 20, 2017, in connection with Chinese Patent Application No. 201480034547.1.
Korean Office Action dated Nov. 19, 2020, in connection with Korean Patent Application No. 10-2019-7018909.
German Search Report dated Mar. 13, 2014.
International Search Report dated Aug. 12, 2014, dated Aug. 25, 2014.
English Translation of International Search Report dated Aug. 12, 2014, dated Aug. 25, 2014.
English Translation of JP Office Action corresponding to JP Application No. 2016-520366 dated Mar. 23, 2018.
Canadian Office Action corresponding to Canadian Application No. 2,913,389 dated Apr. 23, 2018.
English translation of Japanese Office Action corresponds to Japanese Application No. 2016-520366 dated Oct. 4, 2018.
English Translation of Chinese Office Action dated Feb. 22, 2017, corresponds to Chinese Application No. 201480034547.1.
Third Chinese Office Action corresponding to Chinese Application No. 201480034547.1 dated Jun. 15, 2018.
English Machine Translation of EP 0300847 A1 filed Jul. 7, 2017.

* cited by examiner

REACTIVE 2-COMPONENT ADHESIVE SYSTEM IN FILM FORM HAVING IMPROVED HEAT-AND-HUMIDITY RESISTANCE

This application is a § 371 national stage of PCT International Application No. PCT/EP2017/080026, filed Nov. 22, 2017, which claims foreign priority benefit under 35 U.S.C. § 119 of German Patent Application No. 10 2016 224 169.9, filed Dec. 5, 2016, the disclosures of each of which are incorporated herein by reference.

DESCRIPTION

Technical Field of the Invention

The present invention relates to a 2-component adhesive system in film form for bonding various materials, such as, for example, metal, wood, glass and/or plastic material. This 2-component adhesive system comprises two reactive adhesive films each comprising (a) a polymeric film-forming matrix and (b) at least one reactive monomer or reactive resin, wherein the first adhesive film additionally comprises at least one radical initiator and the second adhesive film additionally comprises at least one activator and wherein the at least one reactive monomer or reactive resin comprises a nitrogen-containing vinyl compound and/or a nitrogen-containing oligomeric or polymeric compound having carbon-carbon double bond(s). There is additionally provided a method for producing the reactive adhesive films according to the invention, as described above, and a kit for providing the reactive adhesive film system according to the invention, comprising a first and a second reactive adhesive film, as described above.

General Prior Art

2-Component adhesive systems have generally been known for many years and are described in detail in the specialist literature. In such systems, an adhesive system consisting of two components is applied to the parts to be bonded, wherein two liquid components are conventionally used. For example, in the case of chemically reacting 2-component polymerization adhesive systems, one component comprises the monomer to be polymerized and an activator and the other component comprises a radical-forming substance (also called curing agent or initiator) and the monomer to be polymerized. After the two components have been mixed, or at least brought into contact, and activated, which in most cases takes place by means of heat, the radical-forming substance is cleaved into two radicals by the activator and the polymerization reaction of the monomers to be polymerized begins. The radical chain polymerization of the monomer then takes place until chain termination occurs, and the adhesive composition cures, whereby permanent bonding of the parts to be bonded is achieved.

A disadvantage of such liquid 2-component polymerization adhesive systems is that they are often not clean to use, because the two components must in most cases be applied in the liquid to pasty state to the parts to be bonded. This is a problem especially in the case of bonds over large areas and/or in applications in which the surfaces are uneven, for example sloping. In addition, activation of the adhesive system generally takes place at elevated temperatures, which can be a problem for sensitive substrates, such as, for example, anodized aluminum. A further disadvantage of such systems is that the storage stability of the two components can be critical. Moreover, after they have cured fully, conventional 2-component polymerization adhesive systems are frequently associated with problems which only come to light in the event of shocks. Thus, in the case of the systems of the prior art, cracks or breaks can occur in the region of the bonds as a result of violent shocks. Also, the heat-and-humidity resistance of the adhesive systems is often not ideal.

Object of the Present Invention

Accordingly, the object underlying the present invention is to provide an improved reactive 2-component adhesive system. Against this background, the present invention proposes a reactive 2-component adhesive system in film form for bonding various materials, in order to avoid the above-described problems of the known, liquid 2-component adhesive systems.

In particular, there is provided a reactive 2-component adhesive system in film form which is simple to handle and ideally already exhibits pressure sensitive adhesion, so that there is no slipping when applied to the substrates to be bonded and more precise bonding is made possible than with the liquid 2-component polymerization adhesive systems known in the prior art. Further in particular the reactive 2-component adhesive system in film form of the present invention is characterized in that it exhibits enhanced heat-and-humidity resistance.

SUMMARY OF THE INVENTION

The present invention relates to a reactive adhesive film system comprising two reactive adhesive films, wherein the first adhesive film comprises (a) a polymeric film-forming matrix, (b) at least one reactive monomer or reactive resin and (c) at least one initiator, in particular a radical initiator, and the second adhesive film comprises (a) a polymeric film-forming matrix, (b) at least one reactive monomer or reactive resin and (c) at least one activator, and wherein the two adhesive films are characterized in that they comprise nitrogen-containing vinyl compounds and/or nitrogen-containing oligomeric or polymeric compounds having carbon-carbon double bond(s) as reactive monomers or reactive resins.

This reactive adhesive film system is suitable as a 2-component polymerization adhesive system in film form for the improved bonding of various materials with high heat-and-humidity resistance.

DETAILED DESCRIPTION OF THE INVENTION

According to the invention, the above-described object is achieved by a reactive adhesive film system comprising two reactive adhesive films. This adhesive film system is characterized in that the first reactive adhesive film comprises a polymeric film-forming matrix (a), at least one reactive monomer or reactive resin (b) and an initiator, in particular a radical initiator (c) and the second reactive adhesive film comprises a polymeric film-forming matrix (a), at least one reactive monomer or reactive resin (b) and an activator (c), wherein, as the at least one reactive monomer or reactive resin, use is made of a nitrogen-containing vinyl compound and/or of a nitrogen-containing oligomeric or polymeric compound having carbon-carbon double bond(s).

In one embodiment according to the invention there is consequently provided a reactive adhesive film comprising (a) a polymeric film-forming matrix, (b) at least one reactive monomer or reactive resin and (c) a reagent selected from an initiator, in particular a radical initiator, or an activator, wherein the at least one reactive monomer or reactive resin comprises a nitrogen-containing vinyl compound and/or a nitrogen-containing oligomeric or polymeric compound having carbon-carbon double bond(s).

In a further embodiment according to the invention there is provided a reactive adhesive film system comprising two reactive adhesive films A and B, characterized in that the first reactive adhesive film A comprises an initiator, in particular a radical initiator, and the second reactive adhesive film B comprises an activator, and the at least one reactive monomer or reactive resin comprises a nitrogen-containing vinyl compound and/or a nitrogen-containing oligomeric or polymeric compound having carbon-carbon double bond(s).

In a further embodiment according to the invention there is disclosed a method for producing a reactive adhesive film according to the invention, wherein the method comprises the following steps:
1. dissolving and/or finely distributing the ingredients in one or more solvent(s) and/or water,
2. mixing the dissolved or finely distributed ingredients,
3. coating a release liner or release paper, a backing material or a pressure sensitive adhesive with the mixture of dissolved or distributed ingredients according to step 2,
4. evaporating the solvent and/or water, and
5. optionally winding the reactive adhesive film into a roll, wherein the ingredients include (a) a polymeric film-forming matrix, (b) at least one reactive monomer or reactive resin and (c) a reagent selected from an initiator, in particular a radical initiator, or an activator.

Steps 1 and 2 can also take place in one step, that is to say the ingredients are dissolved and/or finely distributed simultaneously.

In a further embodiment according to the invention there is disclosed a method for producing a reactive adhesive film according to the invention, wherein the method is solvent- and water-free. Accordingly, formulations for reactive adhesive films according to the invention are produced by the action of heat and/or shear, for example in a hot melt kneader or compounding extruder.

In another embodiment according to the invention there is disclosed a kit for providing a two-component adhesive film system, comprising (i) at least one first reactive adhesive film which comprises an initiator, in particular a radical initiator, and (ii) at least one second reactive adhesive film which comprises an activator.

In a further embodiment according to the invention there is disclosed a composite bonded by means of the reactive adhesive film system according to the invention or by means of the kit according to the invention.

The components of the adhesive films according to the invention, and of the adhesive film system according to the invention, are described in detail below.

Polymeric Film-Forming Matrix

The adhesive films according to the invention in principle comprise a matrix, called the polymeric film-forming matrix below, containing the reactive resins and/or reactive monomers to be polymerized. The purpose of this matrix is to form an inert framework for the reactive monomers and/or adhesive resins so that they are not—as in the prior art—in liquid form and thus able to cause the stated problems, but are incorporated in a film or a foil. Easier handling is thus ensured.

Inert in this context means that the reactive monomers and/or reactive resins substantially do not react with the polymeric film-forming matrix under suitably chosen conditions (e.g. at sufficiently low temperatures).

Suitable film-forming matrices for use in the present invention are preferably chosen from the following list: a thermoplastic polymer, such as, for example, a polyester or copolyester, a polyamide or copolyamide, a polyacrylic acid ester, an acrylic acid ester copolymer, a polymethacrylic acid ester, a methacrylic acid ester copolymer, thermoplastic polyurethanes as well as chemically or physically cross-linked substances of the above-mentioned compounds. In addition, blends of different thermoplastic polymers can also be used.

Furthermore, elastomers and thermoplastic elastomers, on their own or in a mixture, are also conceivable as the polymeric film-forming matrix. Thermoplastic polymers, in particular semi-crystalline thermoplastic polymers, are preferred.

Thermoplastic polymers having softening temperatures of less than 100° C. are particularly preferred. In this connection, the expression softening point denotes the temperature from which the thermoplastic granules bond to themselves. If the constituent of the polymeric film-forming matrix is a semi-crystalline thermoplastic polymer, then it very preferably has, in addition to its softening temperature (which is associated with the melting of the crystallites), a glass transition temperature of not more than 25° C., preferably not more than 0° C.

In a preferred embodiment according to the invention, a thermoplastic polyurethane is used. The thermoplastic polyurethane preferably has a softening temperature of less than 100° C., in particular less than 80° C.

In a particularly preferred embodiment according to the invention, Desmomelt 530®, which is obtainable commercially from Bayer Material Science AG, 51358 Leverkusen, Germany, is used as the polymeric film-forming matrix. Desmomelt 530° is a hydroxyl-terminated, largely linear, thermoplastic polyurethane elastomer with a high degree of crystallization.

According to the invention, the amount of polymeric film-forming matrix is in the range of approximately from 10 to 90% by weight, preferably approximately from 20 to 50% by weight, based on the total mixture of the constituents of the reactive adhesive film. There is more preferably used from 25 to 45% by weight, most preferably approximately 30 to 40% by weight, of the polymeric film-forming matrix, based on the total mixture of the constituents of the reactive adhesive film. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Reactive Monomer or Reactive Resin

As used herein, the reactive monomer or reactive resin is to denote a monomer or resin which is capable in particular of radical chain polymerization.

According to the invention, a suitable reactive monomer is selected from nitrogen-containing vinyl compounds and/or nitrogen-containing oligomeric and/or polymeric compounds having carbon-carbon double bond(s).

The term "compound having carbon-carbon double bond(s)" as used herein represents a compound having one double bond or two or more double bonds.

In one preferred embodiment, the reactive monomer is one or more representatives selected from cyclic, non-aromatic, nitrogen-containing vinyl compounds.

In particular the at least one reactive monomer or reactive resin is selected from: N-vinylcaprolactam (CAS No. 2235-00-9) and/or N-vinylpyrrolidone (CAS No. 88-12-0).

Moreover, besides the nitrogen-containing vinyl compounds and/or nitrogen-containing oligomeric and/or polymeric compounds having carbon-carbon double bond(s), as described above, there may be one or more representatives selected from the following group: methyl methacrylate (CAS No. 80-62-6), methacrylic acid (CAS No. 79-41-4), cyclohexyl methacrylate (CAS No. 101-43-9), tetrahydrofurfuryl methacrylate (CAS No. 2455-24-5), 2-phenoxyethyl methacrylate (CAS No. 10595-06-9), hydroxyalkyl methacrylates, 2-hydroxyethyl methacrylate (CAS No. 868-77-9), 2-hydroxypropyl methacrylate (CAS Nos. 923-26-2 and 27813-02-1), 4-hydroxybutyl methacrylate (CAS Nos. 29008-35-3 and 997-46-6), di(ethylene glycol)methyl ether methacrylate (CAS No. 45103-58-0) and/or ethylene glycol dimethacrylate (CAS No. 97-90-5).

Particular preference is given in accordance with the invention to using N-vinylcaprolactam and/or N-vinylpyrrolidone as reactive monomers to be polymerized.

In a particularly preferred embodiment according to the invention, the reactive adhesive film comprises a mixture of 2-phenoxyethyl methacrylate, 2-hydroxyethyl methacrylate, 2-hydroxypropyl methacrylate, N-vinylcaprolactam and ethylene glycol dimethacrylate as reactive monomers to be polymerized.

Moreover, there may be further reactive resin(s) present, such as, for example, oligomeric (meth)acrylates with mono-, di-, tri- and higher functionalization. These are very advantageously used in a mixture with at least one reactive monomer, as described above.

According to the invention, each of these preferred embodiments can be combined with a thermoplastic polyurethane, such as, for example, Desmomelt 530®, as the polymeric film-forming matrix.

According to the invention, the amount of reactive monomer/monomers/reactive resin/resins is in the range of approximately 10-90% by weight, preferably approximately 40-70% by weight, based on the total mixture of the constituents of the reactive adhesive film. Most preferably, approximately 45-65% by weight of the reactive monomer/monomers/reactive resin/resins, based on the total mixture of the constituents of the reactive adhesive film, are used. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Initiator, in Particular Radical Initiator

As used herein, the term initiator, in particular radical initiator or radical-forming substance (or else curing agent), denotes a compound which is able to initiate a polymerization reaction or crosslinking of the adhesive. However, the initiator, in particular radical initiator, plays a very small part in the reaction and consequently does not form a polymer component which determines the properties of the bond.

In the present invention, an initiator, in particular a radical initiator, is added to the at least one first reactive adhesive film of the adhesive film system.

Radical initiators are preferred. Any radical initiators known in the prior art can be used. Preferred radical initiators are peroxides, hydroperoxides and azo compounds. In a particularly preferred embodiment according to the invention, the radical initiator is an organic peroxide. Particular preference is given to hydroperoxides, especially α,α-dimethylbenzyl hydroperoxide, which is also known as cumene hydroperoxide (CAS No. 80-15-9). Also preferred are diisopropylbenzene hydroperoxide
(CAS No. 26762-93-6), p-menthane hydroperoxide (CAS No. 26762-92-5), tert-amyl hydroperoxide (CAS No. 3425-61-4) and 1,1,3,3-tetramethylbutyl hydroperoxide (CAS No. 5809-08-5).

According to the invention, the amount of radical initiator is in the range of approximately from 1 to 20% by weight, preferably approximately from 5 to 15% by weight, based on the total mixture of the constituents of the reactive adhesive film. There are most preferably used approximately from 8 to 12% by weight of radical initiator, based on the total mixture of the constituents of the reactive adhesive film. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Activator

As used here, the term activator denotes a compound which at only very low concentrations actually enables or accelerates the process of polymerization. Activators can also be called accelerators.

In the present invention, an activator is added to the at least one second reactive adhesive film of the adhesive film system.

Suitable activators for use in the present invention, if a radically polymerizable system is to be activated, are selected, for example, from the group consisting of: an amine, a dihydropyridine derivative, a transition metal salt or a transition metal complex. In particular, tertiary amines and/or transition metal complexes are used for activating the radical-forming substance.

In an embodiment according to the invention, the activator is 3,5-diethyl-1,2-dihydro-1-phenyl-2-propylpyridine (also called PDHP, CAS No. 34562-31-7).

In a further embodiment according to the invention, a complex compound is used which has a manganese, iron or cobalt ion as central atom and as ligand a compound containing carbon-nitrogen double bonds. The compound containing carbon-nitrogen double bonds is present anionically within the complex compound. In the complex compound, the manganese, iron or cobalt ion has a double positive charge, while the compound containing carbon-nitrogen double bonds has a double negative charge. In the complex compound, the manganese, iron or cobalt ion replaces respectively two hydrogen atoms which the ligand carried on the nitrogen atoms prior to the reaction to form the complex compound.

In one preferred embodiment according to the invention, the ligand has a cyclic structure, preferably a porphyrin, porphyrazine or phthalocyanine ring structure. These structures may be understood as framework structures. The ligands may optionally carry substituents in place of the H atoms bonded to carbon atoms. In this case, the phrase "derivatives of these compounds" is used. Suitable substituents are selected from the group consisting of fluorine, chlorine, bromine, iodine, methyl, ethyl, propyl, isopropyl, butyl, tert-butyl, —OH, —NH$_2$, —NO$_2$.

One particularly suitable activator comprises manganese (II) phthalocyanine (CAS No. 14325-24-7), iron(II) phthalocyanine (CAS No. 132-16-1) or cobalt(II) phthalocyanine (CAS No. 3317-67-7). The most preferred activator used is iron(II) phthalocyanine (CAS No. 132-16-1).

According to the invention, the amount of activator is in the range of from greater than 0 to approximately 10% by weight, preferably approximately 0.1-5.0% by weight. There is most preferably used approximately from 0.2-3.0% by weight, yet more preferably 0.5-2.0% by weight, activator, based on the total mixture of the constituents of the reactive adhesive component. The total mixture of the constituents of the reactive adhesive film here denotes the total amount of the polymeric film-forming matrix (a) that is used, the reactive monomers or reactive resins (b), the reagent (c) and further components which are optionally present, which is obtained as the total (in % by weight).

Crosslinker

As used here, the term crosslinker denotes chemical compounds which are capable of providing linear molecule chains with reactive functional groups so that three-dimensionally crosslinked structures can form from the two-dimensional structures by the formation of intermolecular bridges.

Typical examples of crosslinkers are chemical compounds which have two or more identical or different functional groups within the molecule or at the two molecule ends and are consequently able to crosslink molecules of identical or different structures with one another. Unlike the activator, as described above, a crosslinker is incorporated into the polymer network.

In a particularly preferred embodiment according to the invention, ethylene glycol dimethacrylate (CAS No. 97-90-5) is used as the crosslinker and/or additional reactive monomer besides the nitrogen-containing vinyl compound and/or the nitrogen-containing oligomeric or polymeric compound having carbon-carbon double bond(s), as described above (see above).

Other preferred crosslinkers are diacrylates, dimethacrylates, triacrylates, trimethacrylates, and acrylates and/or methacrylates of higher functionality.

Further Constituents of the Reactive Adhesive Film

The reactive adhesive films of the present invention can optionally comprise further additives and/or auxiliary substances which are known in the prior art. Mention may be made here of, for example, fillers, colorants, nucleating agents, rheological additives, blowing agents, adhesion-enhancing additives (adhesion promoters, tackifier resins), compounding agents, plasticizers and/or anti-aging agents, light and UV stabilizers, for example in the form of primary and secondary antioxidants.

Reactive Adhesive Film

As used herein, the term "adhesive film" (or else adhesive layer or film of adhesive) is intended to encompass a completely or incompletely provided application of the respective mixture of components, as described below. Thus, for example, a dotwise application of the adhesive components that does not completely cover the substrate surface(s) to be bonded may likewise lead to a permanent bond in the sense of the present invention.

In a preferred embodiment according to the invention, the at least one first adhesive film A comprises a mixture of the following constituents: thermoplastic polyurethane, in particular Desmomelt 530®, 2-phenoxyethyl methacrylate, 2-hydroxyethyl methacrylate, 2-hydroxypropyl methacrylate, N-vinylcaprolactam, ethylene glycol dimethacrylate and cumene hydroperoxide.

Each of the preferred embodiments according to the invention comprises approximately from 10 to 90% by weight thermoplastic polyurethane, approximately from 10 to 90% by weight reactive monomer(s) and approximately from 1 to 20% by weight cumene hydroperoxide, preferably approximately from 20 to 50% by weight thermoplastic polyurethane, approximately from 40 to 70% by weight reactive monomers and approximately from 5 to 15% by weight cumene hydroperoxide, based on the total mixture of the constituents of the reactive adhesive film.

In a preferred embodiment according to the invention, the at least one second adhesive film B comprises a mixture of the following constituents: thermoplastic polyurethane, in particular Desmomelt 530®, 2-phenoxyethyl methacrylate, 2-hydroxyethyl methacrylate, 2-hydroxypropyl methacrylate, N-vinylcaprolactam, ethylene glycol dimethacrylate and iron(II) phthalocyanine.

Each of the preferred embodiments according to the invention comprises approximately from 10 to 90% by weight thermoplastic polyurethane, approximately from 10 to 90% by weight reactive monomer(s) and from greater than 0 to approximately 10% by weight iron(II) phthalocyanine, preferably approximately from 20 to 50% by weight thermoplastic polyurethane, approximately from 40 to 70% by weight reactive monomer(s) and approximately from 0.1 to 5% by weight iron(II) phthalocyanine, based on the total mixture of the constituents of the reactive adhesive film.

As used herein, the total mixture of the constituents of the reactive adhesive film refers to the total amount of the polymeric film-forming matrix A that is used, the reactive monomer/monomers and/or reactive resin/resins B, the reagent (c) and further components which are optionally present, which is obtained as the total (in % by weight).

The reactive adhesive film of the invention generally has a layer thickness in the range of approximately from 20 to 200 μm, preferably approximately from 30 to 100 μm, more preferably approximately from 40 to 60 μm and particularly preferably approximately 50 μm. In order to produce greater layer thicknesses, it can be advantageous to laminate a plurality of adhesive film layers together.

The reactive adhesive film according to the invention is additionally characterized in that it preferably has properties of pressure sensitive adhesion. Pressure sensitive adhesive substances are defined according to Römpp ($_{Vinylmonomere}$) as viscoelastic adhesives whose set, dry film is permanently tacky and remains adhesive at room temperature. Pressure sensitive adhesion takes place immediately to almost all substrates by the application of gentle pressure. Gentle pressure here means a pressure of greater than 0 bar which is exerted for a period of more than 0 seconds.

Reactive Adhesive Film System

According to the invention, the first and second reactive adhesive films, as described above, are used for a reactive adhesive film system which is characterized in that the first reactive adhesive film A, as well as comprising the film-forming matrix A and at least one reactive monomer or reactive resin B, also comprises an initiator, in particular a radical initiator, and the second reactive adhesive, as well as comprising the film-forming matrix A and at least one reactive monomer or reactive resin B, also comprises an activator, and the at least one reactive monomer or reactive resin used is a nitrogen-containing vinyl compound and/or a nitrogen-containing oligomeric or polymeric compound having carbon-carbon double bonds. Preferably, moreover, iron(II) phthalocyanine is employed as activator.

There is additionally provided according to the invention a reactive adhesive film system comprising two or more reactive adhesive films, as defined above, characterized in that a first reactive adhesive film A comprises an initiator, in particular a radical initiator, and a second reactive adhesive film B comprises an activator, and these two reactive adhesive films A and B are each present alternately.

The first and second reactive adhesive components A and B crosslink and cure as soon as they are brought into contact over a large area under moderate pressure, in particular from 0.5 to 3 bar, at room temperature (23° C.). Electively, higher or lower temperatures, respectively, are also possible. The mentioned moderate pressure is in particular to be achievable by hand. According to the invention, the room temperature contact time is from a few seconds to a few minutes, preferably 10 to 60 seconds. The pressure can be applied mechanically or manually.

If the two reactive adhesive components A and B, as described above, are applied beforehand to the substrates to be bonded, permanent bonding of the substrates occurs as a result of the above-described crosslinking. Alternatively, adhesive component A can first be applied to the first substrate to be bonded, and adhesive component B can be applied to adhesive component A. The second substrate to be bonded is then applied to adhesive component B.

Furthermore, the reactive adhesive system of the invention can comprise further films, layers, adhesives and also permanent and/or temporary backings.

Suitable backing materials are known to a person skilled in the art. For example, films (polyesters, PET, PE, PP, BOPP, PVC, polyimides), nonwovens, foams, woven fabrics and/or fabric foils can be used as permanent backings. Temporary backings should be provided with a release layer, wherein the release layer generally consists of a silicone release coating or a fluorinated release coating or is polyolefinic in nature (HDPE, LDPE).

It may be necessary for the surfaces of the substrates to be bonded to be pretreated by a physical, chemical and/or physico-chemical process. The application of a primer or of an adhesion promoter composition, for example, is advantageous here.

Substrates

Suitable substrates which are suitable for bonding via the reactive adhesive film system according to the invention are metals, glass, wood, concrete, stone, ceramics, textiles and/or plastic materials. The substrates to be bonded can be identical or different.

In a preferred embodiment, the reactive adhesive film system according to the invention is used for bonding metals, glass and plastic materials. In a particularly preferred embodiment according to the invention, polycarbonates and anodized aluminum are bonded.

The metal substrates to be bonded can generally be manufactured from any common metals and metal alloys. Metals such as, for example, aluminum, stainless steel, steel, magnesium, zinc, nickel, brass, copper, titanium, iron-containing metals and alloys are preferably used. The parts to be bonded can additionally be composed of different metals.

Suitable plastic substrates are, for example, acrylonitrile-butadiene-styrene copolymers (ABS), polycarbonates (PC), ABS/PC blends, PMMA, polyamides, glass fiber reinforced polyamides, polyvinyl chloride, polyvinylene fluoride, cellulose acetate, cycloolefin copolymers, liquid crystal polymers (LCP), polylactide, polyether ketones, polyetherimide, polyethersulfone, polymethacrylmethylimide, polymethylpentene, polyphenyl ether, polyphenylene sulfide, polyphthalamide, polyurethanes, polyvinyl acetate, styrene-acrylonitrile copolymers, polyacrylates and polymethacrylates, polyoxymethylene, acrylic ester-styrene-acrylonitrile copolymers, polyethylene, polystyrene, polypropylene and/or polyesters, such as, for example, polybutylene terephthalates (PBT) and/or polyethylene terephthalate (PET).

Substrates can be painted, printed, metallized or sputtered.

The substrates to be bonded can have any desired form which is required for the use of the resulting composite. In the simplest form, the substrates are flat. In addition, three-dimensional substrates, which are sloping, for example, can also be bonded using the reactive adhesive film system according to the invention. The substrates to be bonded can also have a wide variety of functions, such as, for example, casing, viewing window, stiffening elements, etc.

Method for Producing a Reactive Adhesive Film

The reactive adhesive films according to the invention are produced by the method described below:

In a first step, the ingredients are dissolved or finely distributed in one or more solvent(s) and/or water. Alternatively, no solvent and/or water is necessary because the ingredients are already wholly soluble in one another (optionally under the action of heat and/or shear). Suitable solvents are known in the art, wherein solvents in which at least one of the ingredients has good solubility are preferably used. Acetone is particularly preferred.

As used herein, the term ingredient includes the polymeric film-forming matrix, at least one reactive monomer or reactive resin, a reagent selected from an initiator, in particular a radical initiator, or an activator, and optionally further additives and/or auxiliaries, as defined above.

The dissolved or finely distributed ingredients are then mixed in a second step. Conventional stirring devices are used to produce the mixture. The solution is optionally additionally heated. The ingredients are optionally dissolved or finely distributed and mixed simultaneously.

Subsequently, in a third step, a release paper, a backing material or a pressure sensitive adhesive is coated with the mixture of the dissolved or finely distributed ingredients according to step 2. The coating is carried out by the conventional techniques known in the art.

After the coating, the solvent is removed by evaporation in a fourth step.

The reactive adhesive film can optionally be wound into a roll in a further step.

For storage, the reactive adhesive films according to the invention are covered with a release liner or release paper.

Alternatively, the reactive adhesive films according to the invention are produced in a solvent-free manner by extrusion, hot melt die coating or calendering.

Kit for Providing a 2-Component Adhesive System in Film Form According to the Invention There is additionally provided according to the invention a kit for providing a reactive 2-component adhesive system in film form. This kit comprises at least one first reactive adhesive film A which comprises an initiator, in particular a radical initiator, as described above, and at least one second reactive adhesive film B which comprises an activator, as described above.

The kit according to the invention is typically used as follows:

The at least one first adhesive component A is applied to a surface of a substrate to be bonded. In addition, the at least one second adhesive component B is applied to a surface of a second substrate to be bonded. Adhesive component A and adhesive component B are brought into contact and left in contact for pressing times in the range of from a few seconds to several minutes, at room temperature (23° C.), whereby the polymerization reaction starts and the adhesive cures. Alternatively, it is also possible to apply the at least one second adhesive component B to the first adhesive component A and only then to apply thereto the surface of a second substrate to be bonded.

The method described above can optionally be repeated in order thus to achieve bonding of the layers substrate-A-B-A-B-substrate or substrate-B-A-B-substrate or substrate-A-B-A-substrate, etc. This can be advantageous if the properties of adhesion between the substrates to be bonded and the first and second adhesive components A and B differ.

Composite

Finally, there is provided according to the invention a composite which is bonded by means of the reactive adhesive film system according to the invention, as defined above, or by the kit according to the invention, as defined above.

Experimental Part

The examples which follow serve to illustrate the present invention but are not to be interpreted as limiting the scope of protection.

Preparing a Solution of the Film-Forming Matrix

PU Solution:
A 20% solution of the film-forming polymer in acetone is prepared by initially weighing 120 g of Desmomelt 530® and 480 g of acetone into a screw top jar and closing the screw top jar. The Desmomelt 530® is dissolved completely by rolling the screw top jar on a roller bench for several days. The operation lasts approximately from one to seven days, depending on the rolling speed. Alternatively, the acetonic solution can also be prepared by stirring the Desmomelt 530® granules in acetone by means of a commercial laboratory stirrer.

Example 1

Production of the First Reactive, Pressure-Sensitively Adhering Adhesive Film A Comprising a Radical Initiator 150.0 g of the 20% solution of Desmomelt 530® in acetone (PU solution) are mixed with 23.2 g of 2-phenoxyethyl methacrylate, 16.7 g of 2-hydroxyethyl methacrylate, 11.1 g of 2-hydroxypropyl methacrylate, 7.0 g of N-vinylcaprolactam, 3.0 g of ethylene glycol dimethacrylate and 10.0 g of Peroxan CU-90 L (90% strength solution of cumene hydroperoxide in cumene, from Pergan) for 30 minutes by means of a commercial laboratory stirrer.

The resulting homogeneous mixture is applied to a siliconized polyester film (release liner) by means of a commercial laboratory coating table (for example from SMO (Sondermaschinen Oschersleben GmbH)) having a coating knife. The acetone is then evaporated off for 10 minutes at 60° C. in a circulating air drying cabinet. The gap width during coating is so adjusted that, after evaporation of the solvent, a 50 μm thick film is obtained. The resulting pressure-sensitively adhering film A is covered with a second siliconized polyester film and stored until bonding.

Production of the Second Reactive, Pressure-Sensitively Adhering Adhesive Film B Comprising an Activator 150.0 g of the 20% solution of Desmomelt 530® in acetone (PU solution) are mixed with 26.2 g of 2-phenoxyethyl methacrylate, 19.7 g of 2-hydroxyethyl methacrylate, 13.1 g of 2-hydroxypropyl methacrylate, 7.0 g of N-vinylcaprolactam, 3.0 g of ethylene glycol dimethacrylate and 1.0 g of iron(II) phthalocyanine (grade: Sigma-Aldrich, about 90% pure) for 30 minutes by means of a commercial laboratory stirrer, so that a mixture with dissolved fractions is formed.

The resulting mixture is applied to a siliconized polyester film (release liner) by means of a commercial laboratory coating table having a coating knife. The acetone is then evaporated off for 10 minutes at 60° C. in a circulating air drying cabinet. The gap width during coating is so adjusted that, after evaporation of the solvent, a 50 μm thick film is obtained. The resulting pressure-sensitively adhering film B is covered with a second siliconized polyester film and stored until bonding.

The percentage compositions of films A and B and the starting solutions are given in the following table, together with the described weighed portions:

Example 1, Solution and Film A

|  | Example 1, solution and film A | | |
|---|---|---|---|
|  | Wt. % solids* | Weighed portion (g) with solvent | Wt. % with solvent |
| PU solution (20 wt. % Desmomelt 530 ® in acetone) | 30.0 | 150.0 | 67.87 |
| 2-Phenoxyethyl methacrylate | 23.2 | 23.2 | 10.49 |
| 2-Hydroxyethyl methacrylate | 16.7 | 16.7 | 7.54 |
| 2-Hydroxypropyl methacrylate | 11.1 | 11.1 | 5.04 |
| n-Vinylcaprolactam | 7.0 | 7.0 | 3.17 |
| Ethylene glycol dimethacrylate | 3.0 | 3.0 | 1.36 |
| Peroxan ® CU 90 L** | 9.0 | 10.0 | 4.52 |
| Total | 100.0 | 221.0 | 100.00 |

*Solids here are all substances apart from solvents. Solvents here are acetone and cumene.
**90 wt. % strength solution of cumene hydroperoxide in cumene, from Pergan Example 1, Solution and Film B

| | Example 1, solution and film B | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 68.18 |
| 2-Phenoxyethyl methacrylate | 26.2 | 26.2 | 11.91 |
| 2-Hydroxyethyl methacrylate | 19.7 | 19.7 | 8.97 |
| 2-Hydroxypropyl methacrylate | 13.1 | 13.1 | 5.93 |
| n-Vinylcaprolactam | 7.0 | 7.0 | 3.18 |
| Ethylene glycol dimethacrylate | 3.0 | 3.0 | 1.36 |
| Iron(II) phthalocyanine | 1.0 | 1.0 | 0.45 |
| Total | 100.0 | 220.0 | 100.00 |

*Solids here are all substances apart from solvents. The solvent here is acetone.

In a manner analogous to that in example 1, the solutions and films A and B of the further inventive and comparative examples are produced.

The tables hereinafter provide information on the compositions of the solutions and films A and B in the further inventive and comparative examples.

Example 2, Solution and Film A

| | Example 2, solution and film A | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 67.87 |
| 2-Phenoxyethyl methacrylate | 18.2 | 18.2 | 8.23 |
| 2-Hydroxyethyl methacrylate | 16.7 | 16.7 | 7.54 |
| 2-Hydroxypropyl methacrylate | 11.1 | 11.1 | 5.04 |
| N-Vinylcaprolactam | 12.0 | 12.0 | 5.43 |
| Ethylene glycol dimethacrylate | 3.0 | 3.0 | 1.36 |
| Peroxan ® CU 90 L** | 9.0 | 10.0 | 4.52 |
| Total | 100.0 | 221.0 | 100.00 |

*Solids here are all substances apart from solvents. Solvents here are acetone and cumene.
**90 wt. % strength solution of cumene hydroperoxide in cumene, from Pergan Example 2, Solution and Film B

| | Example 2, solution and film B | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 68.19 |
| 2-Phenoxyethyl methacrylate | 21.2 | 21.2 | 9.64 |
| 2-Hydroxyethyl methacrylate | 19.7 | 19.7 | 8.97 |
| 2-Hydroxypropyl methacrylate | 13.1 | 13.1 | 5.93 |
| N-Vinylcaprolactam | 12.0 | 12.0 | 5.46 |
| Ethylene glycol dimethacrylate | 3.0 | 3.0 | 1.36 |
| Iron(II) phthalocyanine | 1.0 | 1.0 | 0.45 |
| Total | 100.0 | 220.0 | 100.00 |

*Solids here are all substances apart from solvents. The solvent here is acetone.

Example 3, Solution and Film A

| | Example 3, solution and film A | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 67.87 |
| 2-Phenoxyethyl methacrylate | 23.2 | 23.2 | 10.49 |
| 2-Hydroxyethyl methacrylate | 16.7 | 16.7 | 7.54 |
| 2-Hydroxypropyl methacrylate | 11.1 | 11.1 | 5.04 |
| N-Vinylpyrrolidone | 7.0 | 7.0 | 3.17 |
| Ethylene glycol dimethacrylate | 3.0 | 3.0 | 1.36 |
| Peroxan ® CU 90 L** | 9.0 | 10.0 | 4.52 |
| Total | 100.0 | 221.0 | 100.00 |

*Solids here are all substances apart from solvents. Solvents here are acetone and cumene.
**90 wt. % strength solution of cumene hydroperoxide in cumene, from Pergan Example 3, Solution and Film B

| | Example 3, solution and film B | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 68.18 |
| 2-Phenoxyethyl methacrylate | 26.2 | 26.2 | 11.91 |
| 2-Hydroxyethyl methacrylate | 19.7 | 19.7 | 8.97 |
| 2-Hydroxypropyl methacrylate | 13.1 | 13.1 | 5.93 |
| N-Vinylcaprolactam | 7.0 | 7.0 | 3.18 |
| Ethylene glycol dimethacrylate | 3.0 | 3.0 | 1.36 |
| Iron(II) phthalocyanine | 1.0 | 1.0 | 0.45 |
| Total | 100.0 | 220.0 | 100.00 |

*Solids here are all substances apart from solvents. The solvent here is acetone.

Example 4, Solution and Film A

| | Example 4, solution and film A | | |
|---|---|---|---|
| | Wt. % solids* | Weighed portion (g) with solvent | Wt. % with solvent |
| PU solution (20 wt. % Desmomelt 530 ® in acetone) | 30.0 | 150.0 | 66.66 |
| 2-Phenoxyethyl methacrylate | 27.2 | 27.2 | 12.09 |
| 2-Hydroxyethyl methacrylate | 16.7 | 16.7 | 7.41 |
| 2-Hydroxypropyl methacrylate | 11.1 | 11.1 | 4.95 |
| N-Vinylcaprolactam | 7.0 | 7.0 | 3.11 |
| Ethylene glycol dimethacrylate | 3.0 | 3.0 | 1.33 |
| Peroxan ® IHP-50** | 5.0 | 10.0 | 4.44 |
| Total | 100.0 | 225.0 | 100.00 |

*Solids here are all substances apart from solvents. Solvents here are acetone and diisopropylbenzene.
**50 wt. % strength solution of diisopropyl hydroperoxide in diisopropylbenzene, from Pergan

Example 4, Solution and Film B

|  | Wt. % solids* | Weighed portion (g) with solvent | Wt. % with solvent |
| --- | --- | --- | --- |
| PU solution (20 wt. % Desmomelt 530 ® in acetone) | 30.0 | 150.0 | 68.18 |
| 2-Phenoxyethyl methacrylate | 26.2 | 26.2 | 11.91 |
| 2-Hydroxyethyl methacrylate | 19.7 | 19.7 | 8.97 |
| 2-Hydroxypropyl methacrylate | 13.1 | 13.1 | 5.93 |
| N-Vinylcaprolactam | 7.0 | 7.0 | 3.18 |
| Ethylene glycol dimethacrylate | 3.0 | 3.0 | 1.36 |
| Iron(II) phthalocyanine | 1.0 | 1.0 | 0.45 |
| Total | 100.0 | 220.0 | 100.00 |

*Solids here are all substances apart from solvents. The solvent here is acetone.

Example 5, Solution and Film A

|  | Wt. % solids* | Weighed portion (g) with solvent | Wt. % with solvent |
| --- | --- | --- | --- |
| PU solution (20 wt. % Desmomelt 530 ® in acetone) | 40.0 | 200.0 | 76.63 |
| 2-Phenoxyethyl methacrylate | 18.0 | 18.0 | 6.90 |
| 2-Hydroxyethyl methacrylate | 13.0 | 13.0 | 4.98 |
| 2-Hydroxypropyl methacrylate | 10.0 | 10.0 | 3.83 |
| N-Vinylcaprolactam | 7.0 | 7.0 | 2.68 |
| Ethylene glycol dimethacrylate | 3.0 | 3.0 | 1.15 |
| Peroxan ® CU 90 L** | 9.0 | 10.0 | 3.83 |
| Total | 100.0 | 261.0 | 100.00 |

*Solids here are all substances apart from solvents. Solvents here are acetone and cumene.
**90 wt. % strength solution of cumene hydroperoxide in cumene, from Pergan

Example 5, Solution and Film B

|  | Wt. % solids* | Weighed portion (g) with solvent | Wt. % with solvent |
| --- | --- | --- | --- |
| PU solution (20 wt. % Desmomelt 530 ® in acetone) | 40.0 | 200.0 | 76.92 |
| 2-Phenoxyethyl methacrylate | 22.0 | 22.0 | 8.46 |
| 2-Hydroxyethyl methacrylate | 17.0 | 17.0 | 6.54 |
| 2-Hydroxypropyl methacrylate | 10.0 | 10.0 | 3.85 |
| N-Vinylcaprolactam | 7.0 | 7.0 | 2.69 |
| Ethylene glycol dimethacrylate | 3.0 | 3.0 | 1.15 |
| Iron(II) phthalocyanine | 1.0 | 1.0 | 0.38 |
| Total | 100.0 | 260.0 | 100.00 |

*Solids here are all substances apart from solvents. The solvent here is acetone.

Comparative Example 1, Solution and Film A

|  | Wt. % solids* | Weighed portion (g) with solvent | Wt. % with solvent |
| --- | --- | --- | --- |
| PU solution (20 wt. % Desmomelt 530 ® in acetone) | 30.0 | 150.0 | 67.87 |
| 2-Phenoxyethyl methacrylate | 26.8 | 26.8 | 12.13 |
| 2-Hydroxyethyl methacrylate | 18.5 | 18.5 | 8.37 |
| 2-Hydroxypropyl methacrylate | 12.5 | 12.5 | 5.66 |
| Ethylene glycol dimethacrylate | 3.2 | 3.2 | 1.45 |
| Peroxan ® CU 90 L** | 9.0 | 10.0 | 4.52 |
| Total | 100.0 | 221.0 | 100.00 |

*Solids here are all substances apart from solvents. Solvents here are acetone and cumene.
**90 wt. % strength solution of cumene hydroperoxide in cumene, from Pergan

Comparative Example 1, Solution and Film B

|  | Wt. % solids* | Weighed portion (g) with solvent | Wt. % with solvent |
| --- | --- | --- | --- |
| PU solution (20 wt. % Desmomelt 530 ® in acetone) | 30.0 | 150.0 | 68.18 |
| 2-Phenoxyethyl methacrylate | 30.0 | 30.0 | 13.64 |
| 2-Hydroxyethyl methacrylate | 21.3 | 21.3 | 9.68 |
| 2-Hydroxypropyl methacrylate | 14.5 | 14.5 | 6.59 |
| Ethylene glycol dimethacrylate | 3.2 | 3.2 | 1.45 |
| Iron(II) phthalocyanine | 1.0 | 1.0 | 0.45 |
| Total | 100.0 | 220.0 | 100.00 |

*Solids here are all substances apart from solvents. The solvent here is acetone.

Comparative Example 2, Solution and Film A

|  | Wt. % solids* | Weighed portion (g) with solvent | Wt. % with solvent |
| --- | --- | --- | --- |
| PU solution (20 wt. % Desmomelt 530 ® in acetone) | 30.0 | 150.0 | 66.67 |
| 2-Phenoxyethyl methacrylate | 30.8 | 30.8 | 13.69 |
| 2-Hydroxyethyl methacrylate | 19.0 | 19.0 | 8.44 |
| 2-Hydroxypropyl methacrylate | 12.0 | 12.0 | 5.33 |
| Ethylene glycol dimethacrylate | 3.2 | 3.2 | 1.42 |
| Peroxan ® IHP-50** | 5.0 | 10.0 | 4.44 |
| Total | 100.0 | 225.0 | 100.00 |

*Solids here are all substances apart from solvents. Solvents here are acetone and diisopropylbenzene.
**50 wt. % strength solution of diisopropyl hydroperoxide in diisopropylbenzene, from Pergan

Comparative Example 2, Solution and Film B

|  | Comparative example 2, solution and film B | | |
|---|---|---|---|
|  | Wt. % solids* | Weighed portion (g) with solvent | Wt. % with solvent |
| PU solution (20 wt. % Desmomelt 530 ® in acetone) | 30.0 | 150.0 | 68.18 |
| 2-Phenoxyethyl methacrylate | 32.8 | 32.8 | 14.91 |
| 2-Hydroxyethyl methacrylate | 20.0 | 20.0 | 9.09 |
| 2-Hydroxypropyl methacrylate | 13.0 | 13.0 | 5.91 |
| Ethylene glycol dimethacrylate | 3.2 | 3.2 | 1.45 |
| Iron(II) phthalocyanine | 1.0 | 1.0 | 0.45 |
| Total | 100.0 | 220.0 | 100.00 |

*Solids here are all substances apart from solvents. The solvent here is acetone.

Comparative Example 3, Solution and Film A

|  | Comparative example 3, solution and film A | | |
|---|---|---|---|
|  | Wt. % solids* | Weighed portion (g) with solvent | Wt. % with solvent |
| PU solution (20 wt. % Desmomelt 530 ® in acetone) | 40.0 | 200.0 | 76.63 |
| 2-Phenoxyethyl methacrylate | 21.3 | 21.3 | 8.16 |
| 2-Hydroxyethyl methacrylate | 15.5 | 15.5 | 5.94 |
| 2-Hydroxypropyl methacrylate | 11.0 | 11.0 | 4.21 |
| Ethylene glycol dimethacrylate | 3.2 | 3.2 | 1.23 |
| Peroxan ® CU 90 L** | 9.0 | 10.0 | 3.83 |
| Total | 100.0 | 261.0 | 100.00 |

*Solids here are all substances apart from solvents. Solvents here are acetone and cumene.
**90 wt. % strength solution of cumene hydroperoxide in cumene, from Pergan

Comparative Example 3, Solution and Film B

|  | Comparative example 3, solution and film B | | |
|---|---|---|---|
|  | Wt. % solids* | Weighed portion (g) with solvent | Wt. % with solvent |
| PU solution (20 wt. % Desmomelt 530 ® in acetone) | 40.0 | 200.0 | 76.92 |
| 2-Phenoxyethyl methacrylate | 25.1 | 25.1 | 9.65 |
| 2-Hydroxyethyl methacrylate | 18.7 | 18.7 | 7.19 |
| 2-Hydroxypropyl methacrylate | 12.0 | 12.0 | 4.62 |
| Ethylene glycol dimethacrylate | 3.2 | 3.2 | 1.23 |
| Iron(II) phthalocyanine | 1.0 | 1.0 | 0.38 |
| Total | 100.0 | 260.0 | 100.00 |

*Solids here are all substances apart from solvents. The solvent here is acetone.

Push-Out Test

The push-out test provides information about the bond strength of a double-sidedly adhering adhesive product in the direction normal to the adhesive layer.

Sample Preparation for the Push-Out Test

Round diecuts having a diameter of 21 mm were punched from the adhesive films A and B under investigation, which were both covered on either side with a release liner. The release liners were then removed from one side each of a diecut. The diecuts A were placed precisely in each case onto a round sample disk of polycarbonate ("disk", first substrate, first test body) having a diameter of likewise 21 mm. The diecuts A each now adhered to the "disk". The release paper still remaining on the diecuts was then removed.

The disks therefore now were furnished with the adhesive films A.

The diecuts of the adhesive films B were placed by their uncovered side in each case onto the diecut A adhering to the disk, so that the diecuts B each adhered to the diecuts A. After the contacting of the diecuts A with the diecuts B, it is necessary for the subsequent bonding to the second substrate to take place within not more than one hour, since the curing reaction now progresses.

For further preparation of the adhesive bonds, the last release liners still remaining on the diecuts B were each removed, so that the diecuts B each lay open.

Bonding for the Push-Out Test

The second substrate (second test body) was a square perforated plate made of anodized aluminum. The side lengths respectively were 40 mm. The perforation was in each case located centrally and was round, with a diameter of 9 mm.

The round test bodies furnished with the mutually adhering diecuts A and B were positioned on the perforated plate, by the exposed side of the diecuts in each case, in such a way that the center of the round test body and the center of the perforation in the perforated plate were located one above the other. The assembly, held together by the pressure sensitive adhesiveness of the diecuts and composed of square perforated plate, diecut A, diecut B and the disk, was then placed onto a table so that the square perforated plate was at the bottom. A weight of 2 kg was placed onto the disk. The assembly was exposed to the permanent pressure of the weight a) for 60 seconds and b) for 120 seconds (pressing time) in each case at 23° C. and, in a second series of measurements, at 80° C. (pressing temperature). The weight was then removed. The assembly was then stored for 48 hours at 23° C. and 50% relative humidity. During this time there was a gradually progressing curing reaction within the diecuts and a gradually strengthening adhesion between the diecuts and also to the substrates (test bodies).

Accordingly, bonding took place with a gradual increase in strength over the time.

The assemblies, now therefore fully bonded composites, were subsequently subjected to different forms of storage:

storage 1: 72 hours (=3 days) at 23° C. and 50% relative humidity storage 2: 72 hours (=3 days) at 65° C. and 90% relative humidity.

The push-out tests were carried out after reconditioning for 24 hours at 23° C. and 50% relative humidity.

Procedure of the Push-Out Test

Pressure was applied to the round test body ("disk") by means of a mandrel clamped into a tensile testing machine, which was pressed through the perforation in the perforated plate at a constant rate of 10 mm/min, perpendicularly (i.e.

parallel to the normal vector onto the plane of the test body; centered centrally onto the middle of the perforation) until the bond had come undone in such a way that a pressure drop of 50% was recorded. The pressure acting immediately before the pressure drop is the maximum pressure $P_{max}$. This value corresponds to the push-out value [N/mm$^2$] reported in the table. All the measurements were carried out in a temperature-controlled chamber at 23° C. and 50% relative humidity.

Results

Push-out test

Substrates bonded
Anodized aluminum to polycarbonate
Pressing temperature

| | 23° C. | | | | 80° C. | | | |
|---|---|---|---|---|---|---|---|---|
| | \multicolumn{8}{c}{Pressing time} |
| | 60 sec | | 120 sec | | 60 sec | | 120 sec | |
| | \multicolumn{8}{c}{Storage conditions} |
| | Storage 1 3 d/23° C., 50% rel. humidity | Storage 2 3 d/65° C., 90% rel. humidity | Storage 1 3 d/23° C., 50% rel. humidity | Storage 2 3 d/65° C., 90% rel. humidity | Storage 1 3 d/23° C., 50% rel. humidity | Storage 2 3 d/65° C., 90% rel. humidity | Storage 1 3 d/23° C., 50% rel. humidity | Storage 2 3 d/65° C., 90% rel. humidity |
| Example 1 | 2.1 (A) | 4.7 (A + C) | 2.3 (A) | 4.4 (C) | 3.2 (A + C) | 4.6 (A + C) | 2.7 (A) | 5.1 (A + C) |
| Example 2 | 2.5 (A) | 5.2 (C) | 2.4 (A) | 4.8 (C) | 3.4 (A) | 5.2 (C) | 3.5 (A + C) | 5.3 (A + C) |
| Example 3 | 1.9 (A) | 4.3 (C) | 2.1 (A) | 4.4 (A + C) | 2.8 (A) | 4.3 (A + C) | 3.0 (A + C) | 5.1 (C) |
| Example 4 | 2.3 (A) | 4.8 (A + C) | 2.0 (A) | 3.9 (A + C) | 2.9 (A) | 5.2 (C) | 3.3 (A + C) | 5.1 (A + C) |
| Example 5 | 2.2 (A) | 4.6 (A + C) | 2.5 (A) | 4.9 (C) | 3.1 (A + C) | 4.9 (A + C) | 3.2 (A + C) | 4.6 (A + C) |
| Comparative example 1 | 1.5 (A) | 1.3 (A) | 1.7 (A) | 1.5 (A) | 1.9 (A) | 1.5 (A) | 2.0 (A) | 1.7 (A) |
| Comparative example 2 | 1.4 (A) | 1.0 (A) | 1.5 (A) | 1.4 (A) | 1.9 (A) | 1.7 (A) | 1.8 (A) | 1.5 (A) |
| Comparative example 3 | 1.3 (A) | 1.1 (A) | 1.7 (A) | 1.5 (A) | 1.9 (A) | 1.5 (A) | 2.0 (A) | 1.7 (A) |

All figures for the push-out results in the table are in [N/mm$^2$]

Discussion of the Results

High adhesive strengths are achievable in the push-out test, particularly after heat-and-humidity storage (72 at 65° C. and 90% relative humidity) of the bonded substrates. The values achieved for the bonds of anodized aluminum to polycarbonate are between 3.9 and 5.3 N/mm$^2$. The corresponding results of the comparative examples are between 1.0 and 1.7 N/mm$^2$. Moreover, the bond strengths after heat-and-humidity storage are consistently higher than after storage under standard conditions. In this respect as well, the results differ from the results of the comparative examples.

These examples illustrate the fact that substrates (test bodies) bonded with the reactive adhesive system according to the invention can have been exposed to conditions of heat and humidity. Under these conditions there is no loss of adhesive strength; instead, indeed, the adhesive strength goes up, surprisingly. It is possible to ascertain, moreover, that with the reactive adhesive system according to the invention, substrates can be bonded even at room temperature after a short pressing time, with a strength which goes significantly beyond the strength of typical pressure-sensitive adhesives.

All in all, the adhesive system according to the invention in film form hence permits improved bonding in conjunction with improved usability, and especially an improved heat- and-humidity resistance. The mixing of two components prior to adhesive bonding is not required.

The invention claimed is:

1. A reactive adhesive film, comprising:
   (a) a polymeric film-forming matrix;
   (b) at least one reactive monomer or reactive resin; and
   (c) a reagent, wherein the reagent is at least an activator, the reagent optionally including one of an initiator or a radical initiator,
   wherein the at least one reactive monomer or reactive resin comprises at least a cyclic, non-aromatic, nitrogen-containing vinyl compound ;
   further wherein the only reactive component of the reactive adhesive film is (i) the at least one reactive monomer or reactive resin and (ii) the reagent.

2. The reactive adhesive film as claimed in claim 1, wherein the cyclic, non-aromatic nitrogen-containing vinyl compound comprises a cyclic amide.

3. The reactive adhesive film as claimed in claim 1, further comprising at least one compound selected from the group consisting of an acrylic acid, an acrylic acid ester, a methacrylic acid, and a methacrylic acid ester.

4. The reactive adhesive film as claimed in claim 1, wherein the polymeric film-forming matrix comprises a thermoplastic polymer, a thermoplastic polyurethane, an elastomer, or a thermoplastic elastomer.

5. The reactive adhesive film as claimed in claim 1, wherein the initiator comprises a peroxide, a hydroperoxide, or dimethylbenzyl hydroperoxide.

6. The reactive adhesive film as claimed in claim 1, wherein the activator comprises an amine, a dihydropyridine derivative, a transition metal salt, a transition metal complex, or iron(II) phthalocyanine.

7. The reactive adhesive film as claimed in claim 1, wherein the reactive adhesive film has pressure-sensitive adhesive properties.

8. The reactive adhesive film as claimed in claim 1, comprising the activator, the radical initiator, and further comprising:

(I) from 10 to 90% by weight of the polymeric film-forming matrix, from 10 to 90% by weight of the at least one reactive monomer or reactive resin, and from 1 to 20% by weight of the radical initiator; or
(II) from 10 to 90% by weight of the polymeric film-forming matrix, from 10 to 90% by weight of the at least one reactive monomer or reactive resin, and from greater than 0 to 10% by weight of the activator.

9. The reactive adhesive film as claimed in claim 2, wherein the cyclic, non-aromatic, nitrogen-containing vinyl compound is N-vinylcaprolactam or N-vinylpyrrolidone.

10. The reactive adhesive film as claimed in claim 3, wherein the at least one compound is selected from the group consisting of methyl methacrylate, methacrylic acid, cyclohexyl methacrylate, tetrahydrofurfuryl methacrylate, 2-phenoxyethyl methacrylate, 2-hydroxyethyl methacrylate, 2-hydroxypropyl methacrylate, 4-hydroxybutyl methacrylate, a hydroxybutyl-methacrylate isomer mixture, di(ethylene glycol)methyl ether methacrylate, and ethylene glycol dimethacrylate.

11. The reactive adhesive film as claimed in claim 1, comprising from 20 to 50% by weight of the polymeric film-forming matrix, from 40 to 70% by weight of the at least one reactive monomer or reactive resin, and from 0.1 to 5% by weight of the activator.

12. A reactive adhesive film system comprising a first reactive adhesive film and a second reactive adhesive film as claimed in claim 1, the first reactive adhesive film comprising:
   a polymeric film forming matrix;
   at least one reactive monomer or reactive resin; and
   a reagent, wherein the reagent is one of an initiator or a radical initiator, wherein the at least one reactive monomer or reactive resin comprises a nitrogen containing vinyl compound, a nitrogen containing oligomeric compound having carbon carbon double bond(s).

13. A reactive adhesive film system comprising two or more reactive adhesive films, wherein:
   a first of the two or more reactive adhesive films comprises a reactive adhesive film comprising:
      a polymeric film forming matrix;
      at least one reactive monomer or reactive resin; and
         a reagent, wherein the reagent is one of an initiator or a radical initiator, wherein the at least one reactive monomer or reactive resin comprises a nitrogen containing vinyl compound, a nitrogen containing oligomeric compound having carbon carbon double bond(s);
      a second of the two or more reactive adhesive films comprises a he reactive adhesive film as claimed in claim 1; and
      the first of the two or more reactive adhesive films and the second of the two or more reactive films are each present alternately.

14. The reactive adhesive film system as claimed in claim 12, further comprising films, layers, adhesives, backings, release papers, or release liners.

15. A method of bonding materials of metal, wood, glass, or plastic, comprising bonding metal, wood, glass, or plastic materials with the reactive adhesive film as claimed in claim 1 or the reactive adhesive film system as claimed in claim 12.

16. A method for producing a reactive adhesive film as claimed in claim 1, wherein the method comprising:
   1. dissolving and/or finely distributing ingredients in one or more solvent(s) and/or water;
   2. mixing the dissolved and/or finely distributed ingredients;
   3. coating a release liner, a release paper, a backing material, or a pressure-sensitive adhesive with the mixture of the dissolved and/or finely distributed ingredients to form a reactive adhesive film;
   4. evaporating the one or more solvent(s) and/or water from the reactive adhesive film to form a dried reactive adhesive film; and
   5. optionally winding the dried reactive adhesive film into a roll, wherein the ingredients comprise:
      (a) the polymeric film-forming matrix;
      (b) the at least one reactive monomer or reactive resin; and
      (c) the reagent with at least the activator and either an initiator or a radical initiator.

17. A kit for providing a two-component adhesive film system, comprising:
   at least one first reactive adhesive film, the first reactive adhesive film comprising:
      a polymeric film forming matrix;
      at least one reactive monomer or reactive resin; and
      a reagent, wherein the reagent is one of an initiator or a radical initiator, wherein the at least one reactive monomer or reactive resin comprises a nitrogen containing vinyl compound, a nitrogen containing oligomeric compound having carbon carbon double bond(s) ; and
   (ii) at least one second reactive adhesive film as claimed in claim 1.

18. A composite bonded by the reactive adhesive film system as claimed in claim 12.

19. The reactive adhesive film as claimed in claim 12, further comprising the activator, the radical initiator, and further comprising from 20 to 50% by weight of the polymeric film-forming matrix, from 40 to 70% by weight of the at least one reactive monomer or reactive resin, and from 5 to 15% by weight of the radical initiator.

20. A composite bonded by the kit as claimed in claim 17.

* * * * *